UNITED STATES PATENT OFFICE.

ALFRED STARR, OF NEW YORK, N. Y., ASSIGNOR TO WILLIAM M. WELLING, OF SAME PLACE.

IMPROVED COMPOSITION FOR ARTIFICIAL IVORY.

Specification forming part of Letters Patent No. 75,067, dated March 3, 1868; antedated February 24, 1868.

*To all whom it may concern:*

Be it known that I, ALFRED STARR, of the city and State of New York, have invented, made, and applied to use a certain new and useful Improvement in Composition for Artificial Ivory; and I do hereby declare the following to be a full, clear, and exact description of the said compound and its mode of preparation.

My compound is designed to imitate ivory, and is adapted to the manufacture of any article that can be formed by pressure while in a heated plastic state—for instance, billiard-balls, numbers, counters, checks, paper-cutters, ornamental fancy articles, and in dentistry may be used for the filling of teeth, for artificial-gum work, and for plates, as the said composition may be colored of almost any hue.

The composition I employ is to be heated and mixed in the most thorough manner. For this purpose I mix my ingredients after they have been finely ground or pulverized, and I prefer to employ a pan heated by steam at a temperature of about 240° to 280° Fahrenheit, and then thoroughly mix or grind the substances together between heated rollers, as in the patent of William M. Welling, granted August 4, 1857; and the shaping of the material so prepared is effected by suitable dies or cutters.

I make use of the following ingredients, in about the proportions named: Shellac, eight parts, by weight; asbestus, seven parts, by weight; kaolin, two and one-half parts, by weight; camphor, one-eighth part, by weight. To these I add the desired coloring matter—for light colors, sufficient white lead or similar pigment (about two ounces) to make the compound a white ivory color, and this may be tinted almost any desired hue; but for dark colors a less proportion of white may be employed, or it may be omitted.

What I claim, and desire to secure by Letters Patent, is—

The composition made substantially as set forth, for forming an artificial ivory, as specified.

In witness whereof I have hereunto set my signature this 25th day of July, 1867.

ALFRED STARR.

Witnesses:
    CHAS. H. SMITH,
    GEO. D. WALKER.